Oct. 5, 1965 L. D. LONG 3,210,039
EXPANDABLE CORE-FORMER
Original Filed Aug. 25, 1960 12 Sheets-Sheet 1

INVENTOR.
LEONARD D. LONG,
BY
ATTORNEYS.

Oct. 5, 1965   L. D. LONG   3,210,039
EXPANDABLE CORE-FORMER
Original Filed Aug. 25, 1960   12 Sheets-Sheet 9

INVENTOR.
LEONARD D. LONG,
BY
Schley, Track & Jenkins
ATTORNEYS.

Oct. 5, 1965 L. D. LONG 3,210,039

EXPANDABLE CORE-FORMER

Original Filed Aug. 25, 1960 12 Sheets-Sheet 10

INVENTOR.
LEONARD D. LONG,
BY
ATTORNEYS.

Oct. 5, 1965    L. D. LONG    3,210,039
EXPANDABLE CORE-FORMER
Original Filed Aug. 25, 1960    12 Sheets-Sheet 11

United States Patent Office 3,210,039
Patented Oct. 5, 1965

3,210,039
EXPANDABLE CORE-FORMER
Leonard D. Long, % Long Construction Co., P.O. Box 288, 2110 Mt. Pleasant St. Charleston, S.C.
Original application Aug. 25, 1960, Ser. No. 51,972, now Patent No. 3,090,093, dated May 21, 1963. Divided and this application Aug. 1, 1962, Ser. No. 215,218
3 Claims. (Cl. 249—181)

This application is a division of my copending application Serial No. 51,972, filed August 25, 1960, now Patent 3,090,093, issued May 21, 1963. This invention relates to a core-former, and more particularly to an expandable core-former for producing cores in cored building blocks and the like.

It is an object of my invention to provide a core-former which can be expanded by a rotational thrust force, which can be uniformly expanded throughout its length, which can be expanded against the action of substantial counter-forces, which can be maintained in a fixed position and orientation during its expansion, and which will prove sturdy and durable in use.

In accordance with one form of my invention, the core-former comprises a plurality of core segments having inwardly presented thrust-receiving faces which are operatively engaged by thrust-transmitting cam means mounted on a first shaft interposed between the core segments and rotatable to cause said cam means to move the core segments into spaced relation to each other for expanding the core-former. Conveniently, the core segments are operatively connected to means on said first shaft whereby upon reverse rotation of said first shaft said core segments will be moved toward each other to collapse the core-former.

A plurality of face plates are operatively connected to the several core segments to bridge the spaces between said segments and prevent the entry of the material being cored from entering into the interior of the core-former from the sides thereof when said core-former is expanded. Preferably, the opposed ends of the core segments are also operatively connected to plate means which prevent the material being cored from entering into the interior of the core former from the ends thereof. Conveniently, the plate means at one end of the core-former is provided with a pilot for guiding the core-former into a mold and releasably retaining it in a fixed position therein, and the plate means at the opposite end of the core-former is connected to a second shaft for moving the core-former into and out of operative position in a mold.

Other object and features of my invention will become apparent from the more detailed description which follows and from the accompanying drawings, in which.

My core-former is adapted to be used in combination with an apparatus of the type disclosed in my copending application Serial No. 51,972, filed August 25, 1960, for producing molded components having cores formed therein. The construction of my core-former is such that it can be inserted in a collapsed condition into an appropriate mold prior to the addition of the material to be molded, and then expanded to compress said material against the inwardly presented mold walls. This permits the formation of high-density molded articles having cores formed therein.

For ease of description, the core-formers are described herein as being used to produce cored building blocks formed from an aggregate mixture. It is to be understood, however, that my core-formers can be used for producing various other types of cored elements.

Figures 1, 5:
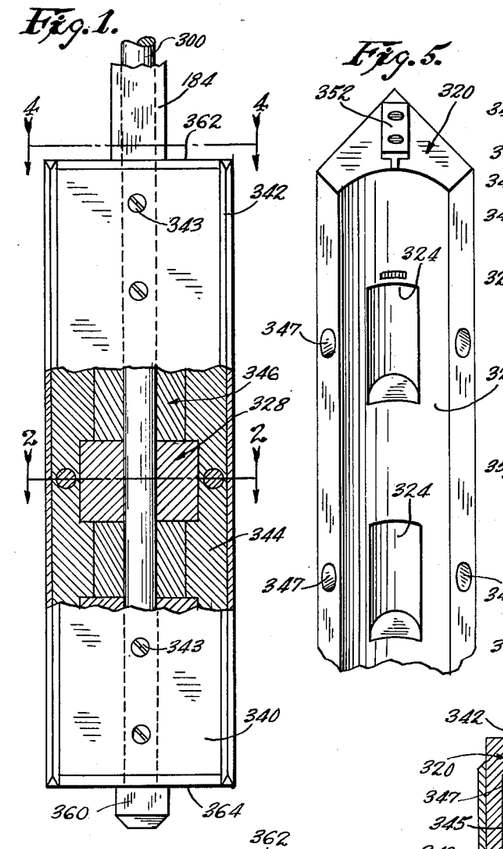
FIG. 1 is a side elevation of a core-former embodying my invention, but with portions thereof being broken away.
FIG. 5 is an enlarged fragmentary isometric view of one of the core segments shown in FIG. 2.
Figure 2:
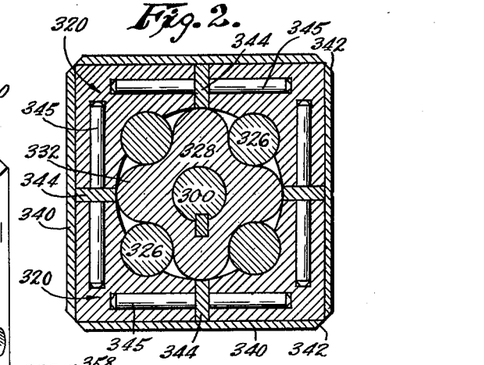
FIG. 2 is a horizontal section taken on the line 2—2 of FIG. 1.

In the core-former shown in FIGS 1–13, there are provided four elongated core segments 320 disposed at the corners of the core-former. Each of said core segments has an arcuate inner face 322 provided with a plurality of generally semicylindrically shaped recesses 324 formed at spaced intervals along its vertical axis. As shown in FIG. 2, each of the recesses 324 supports a roller bearing 326 projecting outwardly from the arcuate segment face 322.

A shaft 300 adapted to be connected to a rotational power source has one of its ends received between the core segments 320, and a plurality of aligned, vertically spaced cams 328 are rigidly mounted on said shaft for rotation therewith. Each of the cams 328 has a plurality of lobes 332 disposed in horizontal alignment with and engageable with a set of the bearings 326 carried in the several core segments. When the core-former is in its collapsed or retracted position, the lobes 332 are disposed out of engagement with the bearings 326, and lie on the transverse axes of the core-former. But upon rotation of the shaft 300, through a 45° angle in a clockwise direction as shown in FIG. 2, the cam lobes 332 are moved into engagement with the bearings 326 to force said bearings, and thus the core segments 320, outwardly on the oblique axes of the core-former.

Figure 6:
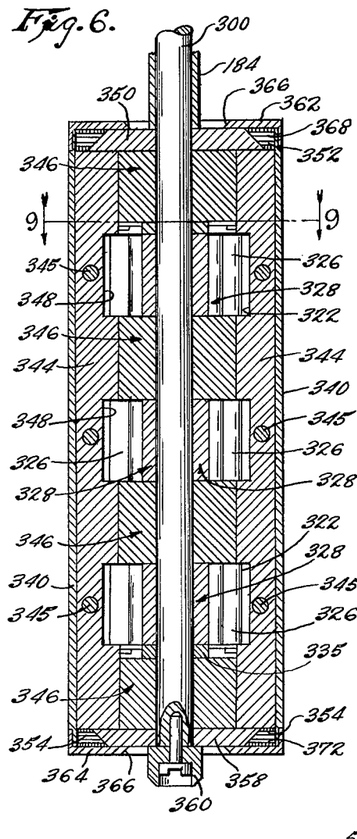
FIG. 6 is a vertical section of the core-former shown in FIG. 1, but showing said core-former in expanded position.
Figure 9:
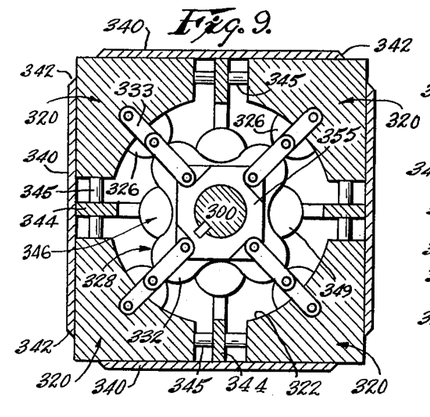
FIG. 9 is a horizontal section taken on the line 9—9 of FIG. 6.
Figure 10:
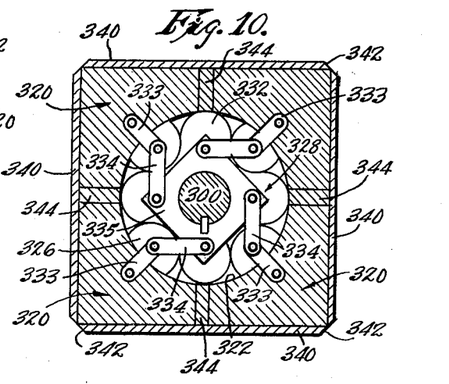
FIG. 10 is a horizontal section similar to FIG. 9, but showing the core-former in collapsed position.
Figure 11:
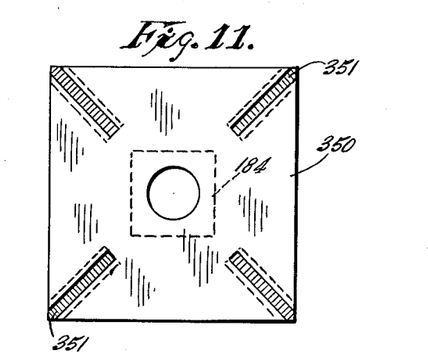
FIG. 11 is a bottom plan view of the spider plate shown in FIG. 4.
Figure 12:
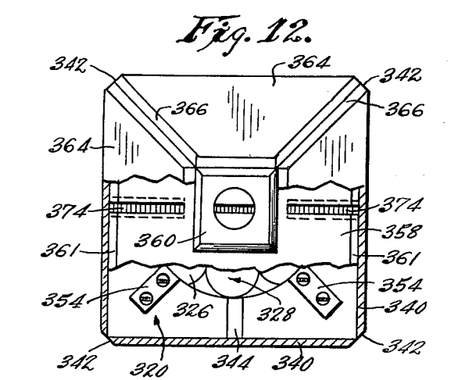
FIG. 12 is a bottom plan view of the core-former shown in FIG. 1, but with portions thereof being broken away.
Figure 13:
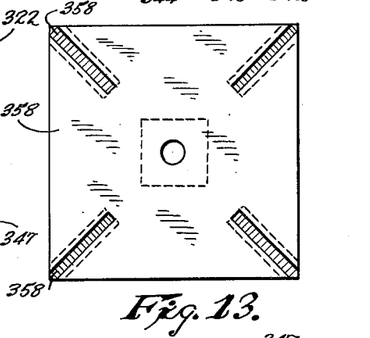
FIG. 13 is a top plan view of the pilot plate shown in FIG. 12.

As shown in FIGS. 9 and 10, the core segments 320 are held in operative position around the cams 328 by means of pivotal linkages. To this end, a pair of arms 333 are rigidly mounted on each of the core segments and project obliquely inwardly from core segment face 322. The inner end of each of the arms 333 is pivotally connected to a link 334 pivotally mounted on a plate 335 mounted on the shaft 300 for rotational movement therewith. As shown in FIG. 6, a pair of the plates 335 are employed, and are conveniently mounted at spaced intervals along the shaft 300. Thus, each of the core segments is operatively connected to the shaft 300 whereby upon rotation of the shaft to expand the core-former, the plates 335 will be rotated and the links 334 will be pivoted outwardly to lie on the oblique core-former axes as shown in FIG. 9. Conversely, as shown in FIG. 10, reverse rotation of the shaft 300 rotates the plates to move the links 334 into positions parallel to the transverse core-former axes, said links pulling the core segments inwardly to their collapsed positions.

As shown in FIG. 2, a plurality of vertically extending face plates 340 having beveled edges 342 are mounted on the core-former to ride against the outer faces of the core segments 320 to prevent the entry or aggregate into the core-former when it is in expanded position. As shown, each of the face plates 340 is connected, as by countersunk screws 343, to a rib 344 extending inwardly between a pair of adjacent core segments. The face plates are held on the core segments by pluralities of horizontally aligned pins 345 slidably received in vertically spaced openings 347 formed in the adjacent faces of adjacent core segments 320 and extending through openings 347 formed in the face plate ribs 344. In this manner the pins 345 hold the face plates on the fore-former and keep the several core segments in horizontal alignment during expansion and collapsing movements. A shown in FIG. 8, the ribs 344 are disposed on the transverse core-former axes, and are thus recessed, as at 348, to accommodate the cam lobes 332 when the core-former is in its collapsed position.

Figure 3:
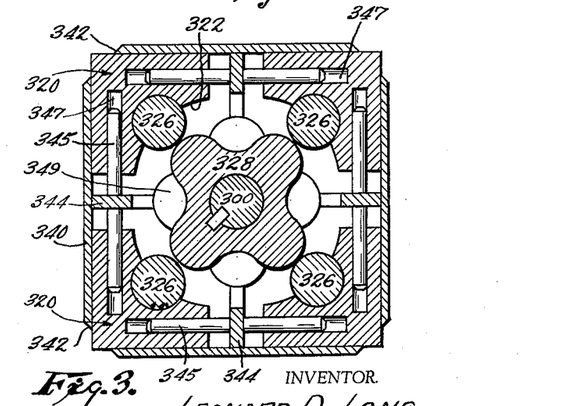
FIG. 3 is a horizontal section taken on the line 2—2 of FIG. 1, but showing the core-former in expanded position.
Figure 7:
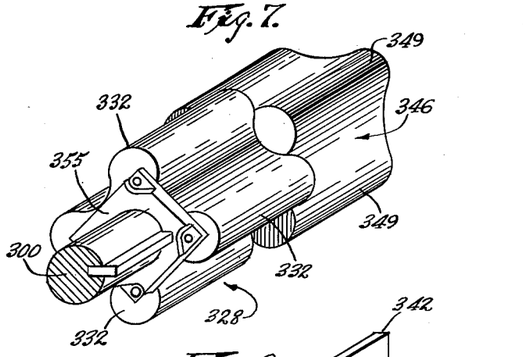
FIG. 7 is an enlarged fragmentary isometric view of the core-former cams shown in FIG. 6.
Figure 8:
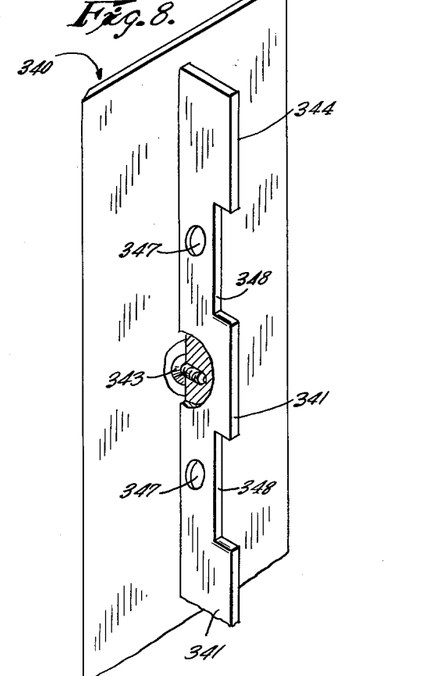
FIG. 8 is an enlarged fragmentary isometric view of one of the face plates shown in FIG. 6.

When the core-former is expanded, as shown in FIG. 3, the face plates 340 bridge the spaces between the spaced core segments with the result that the aggregate being compressed by the core-former exerts an extremely high counteracting compression force against the face plates tending to buckle them inwardly between the spaced core segments. To overcome this difficulty I mount a second set of cams 346 on the shaft 300 interspaced thereon between the cams 328. As shown in FIGS. 3 and 7, the lobes 349 on the cams 346 are disposed out of alignment with the lobes 332 on the cams 328. In this manner, the cam lobes 349 are disposed on the oblique core-former axes between the bearings 326 when the core-former is in collapsed position, but upon rotation of the shaft 300 in the direction of the arrow in FIG. 2, the cam lobes 349 will be rotated into positions to bear against the inwardly presented faces of the ribs 344 to thus prevent the face plates 340 from buckling inwardly when the core-former is expanded.

Figure 4:
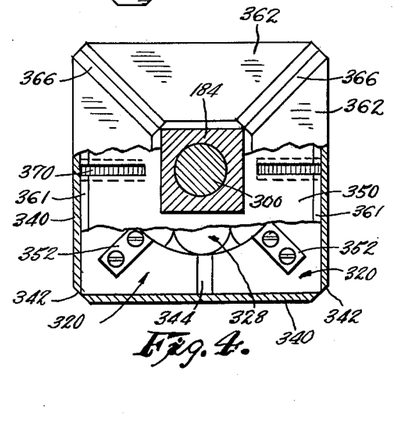
FIG. 4 is a horizontal section taken on the line 4—4 of FIG. 1, but with portions being broken away.

As shown in FIG. 4, the core-former is carried on one end of a non-rotating shaft 184 journaled around the shaft 300 and adapted to be connected to suitable means for axially moving the shaft 184 to move the core-former into and out of a mold. The core-former is connected to the shaft 184 by a spider plate 350 which is mounted on the end of said shaft and has a lateral extent only slightly smaller than the collapsed core-former. A plurality of T-shaped keyways 351 are provided in the lower face of the spider plate on its oblique axes. Each of the keyways 351 extends inwardly from a corner of the plate and slidably receives a T-shaped key 352 mounted on the upper face of one of the core segments to thus support the core segments on the shaft 184 and guide their expansion and collapsing movements. With the spider plate 350 being held stationary, the keys 352 and keyways 351 thus cooperate with the guide pins 345 to prevent the core segments from rotating during core-former collapse and expansion.

As shown in FIG. 6, the lower ends of the core segments 320 also have T-shaped keys 354 slidably received in corresponding keyways 359 formed along the oblique axes of the upper face of a pilot plate 358. A rectangularly shaped pilot 360 projects downwardly from the pilot plate 358 for reception in an opening in the bottom of a mold to guide the core-former into operative position in said mold. The faces of the pilot 360 are adapted to abut the faces of the opening in the bottom of the mold to prevent the pilot plate from rotating so that the keys 354 and keyways 359 can thus guide the expansion and collapsing movements of the core segments. Conveniently, the edges of the spider and pilot plates are beveled, as at 361, to screed any aggregate from the ends of the core segments when said core segments are moved from expanded to collapsed positions.

As shown in FIG. 6, inwardly extending trapezoidal shaped top and bottom cover plates 362 and 364 respectively are connected to the upper and lower ends of each of the face plates 340. The two sets of cover plates 362 and 364 are provided with beveled edges 366, and extend inwardly to abut the shaft 184 and pilot 360 respectively. As shown in FIG. 6, the cover plates 362 have downwardly presented T-shaped keys 368 that are slidably received in a plurality of T-shaped keyways 370 on the transverse axes of the upper face of the spider plate 350. Similarly, the lower cover plates 364 have T-shaped keys 372 slidable in T-shaped keyways 374 on the transverse axes of the lower face of the pilot plate 358. Thus, during expansion and collapse of the core-former, the cover plates 362 and 364 will slide along the spider and pilot plates with their mating keys and keyways guiding their sliding movements and keeping the face plates centered on the lateral core-former faces.

The operational sequence of the core-former illustrated in FIGS. 1–13 is as follows: The core-former is moved into operative position in a mold by means of the shaft 184; the core-former pilot 360 being received in an opening in the bottom of the mold to guide the core-former into position on the bottom of the mold. With the core-former thus positioned in the mold, the shaft 300 is rotated through an angle of 45° to cause the cam lobes 332 on the cams 328 to bear against the roller bearings 326 to force the core segments outwardly along the oblique axes of the core-former into expanded position. Simultaneously, the cam lobes 349 on the cams 346 are rotated into positions of engagement with the ribs 344 on the face plates 340 to support said face plates between the adjacent pairs of spaced core segments 320.

During the rotational movement of the shaft 300, the core segments are prevented from being rotated therewith by the core segment keys 352 and 354 sliding in their respective keyways in the spider and pilot plates 350 and 358. This guiding action of the core segment keys is further enhanced by the pins 345 slidably connecting the pairs of adjacent core segments.

As will be understood, the face plates 340 bridge the spaces between the spaced pairs of adjacent core segments along the side faces of the core-former to prevent the entry of aggregate therein. And the top and bottom cover plates 362 and 364 cooperating with the spider plate 350 and pilot plate 358 respectively prevent the entry of aggregate into the core-former from the top and bottom thereof.

To collapse the core-former, the shaft 300 is rotated in an opposite direction through a 45° angle to rotate the cams 328 to position their lobes 332 on the transverse axes of the core-former, and to rotate the cams 346 to position their lobes 349 on the oblique core-former axes in the spaces between the roller bearings 326 carried in the core segments 320.

As the shaft 300 is rotated in a core-former collapsing direction the plates 335 will be rotated to pivot the links 334 inwardly as shown in FIG. 10, to pull the core segments 320 inwardly toward the vertical axis of the core-former, the movements of the core segments being guided by the keys 352 and 354. This collapsing movement of the core segments 320 causes their outer faces to slide along the inner faces of the face plates with the beveled edges 342 thereof screeding any aggregate from the outer faces of the core segments. Similarly, the beveled edges 366 on the top and bottom cover plates 362 and 364 will screed any aggregate from the plates 350 and 358 respectively. When the core-former has been fully collapsed into the position shown in FIG. 1, it may be moved into a retracted position out of the mold by the shaft 184. As the shaft 184 is moved to move the core-former out of the mold, the shaft movement will be transmitted to the shaft 300 by the pilot plate 358 bearing against the bottom face of the lowermost cam 328 carried on said shaft 300.

Figure 14:
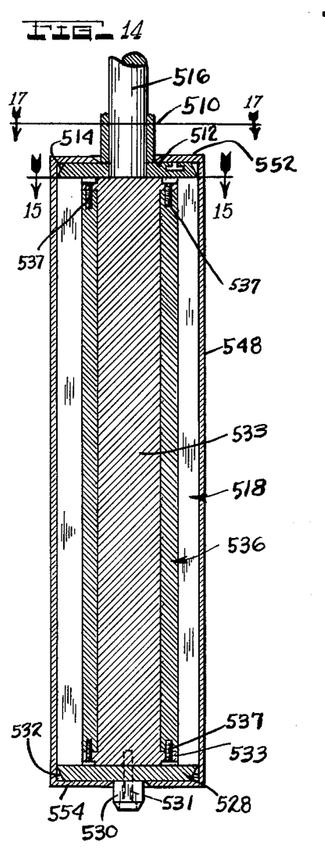
FIG. 14 is a vertical section of a modified form of my expandable core-former.

A modified form of my expandable core-former is illustrated in FIGS. 14–24. In such modification, the core-former is carried on one end of a shaft 510 adapted to be moved axially for moving the core-former into and out of a mold. As shown in FIG. 14, a spider plate 512 is rigidly mounted on the end of the shaft 510 for connecting the core-former to said shaft. Conveniently, the spider plate 512 has a lateral extent substantially as large as the lateral extent of the core-former in collapsed position, and has its edges beveled, as at 514. The core-former is expanded by means of a rotatable shaft 516 extending upwardly through the shaft 510 for connection to a rotational power source.

Figure 15:
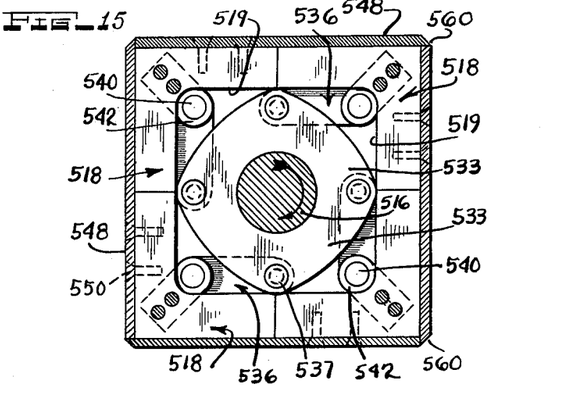
FIG. 15 is a horizontal section taken on the line 15—15 of FIG. 14.
Figures 18, 20, 21:
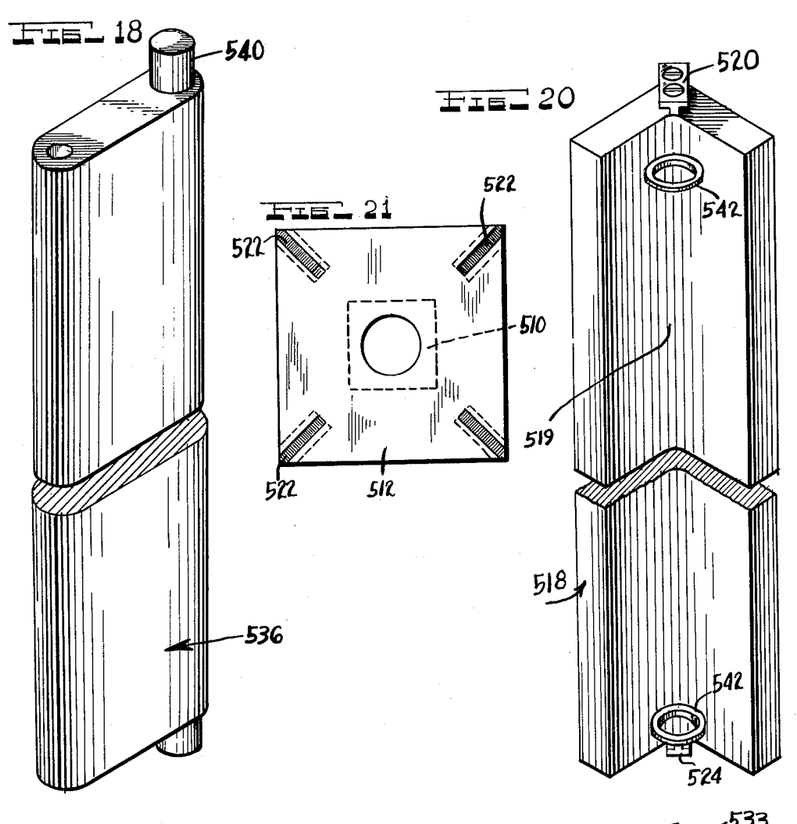
FIG. 18 is an enlarged isometric view of one of the cam followers shown in FIG. 15.
FIG. 20 is an enlarged isometric view of one of the core segments shown in FIG. 15.
FIG. 21 is an enlarged bottom plan view of the spider plate shown in FIG. 17.

As shown in FIG. 15, the core-former is provided with four generally L-shaped core segments 518 having inwardly disposed thrust-receiving faces 519 and slidably connected to the plate 512. To this end, a T-shaped key 520 is mounted on the upper end of each of the core segments 518 and is slidably received in a T-shaped keyway 522 formed in the lower face of the plate 512. As shown in FIG. 21, the keyways 522 are disposed on the oblique axes of the plate 512 and extend inwardly from each of its corners.

Similarly, a T-shaped key 524 is mounted on the lower face of each of the core segments 518, and is slidably received in a T-shaped keyway 526 disposed on an oblique axis of the upper face of a pilot plate 528. A rectangularly shaped pilot 530 extends downwardly from the pilot plate 528 for exception in an opening in the bottom of a mold upon movement of the core-former into said mold, said pilot engaging the faces of said opening to prevent the core-former from rotating in the mold. As shown in FIG. 14, the bolt 531 extends upwardly through the pilot to rotatably connect the pilot plate 528 to the lower end of the shaft 516. Conveniently, the pilot plate 528 has its edges beveled, as at 532, and has a lateral extent corresponding to the lateral extent of the spider plate 512. Thus, the pair of plates 512 and 528 operatively interconnect the four core segments 518 and enclose the ends of the core-former.

Figure 19:
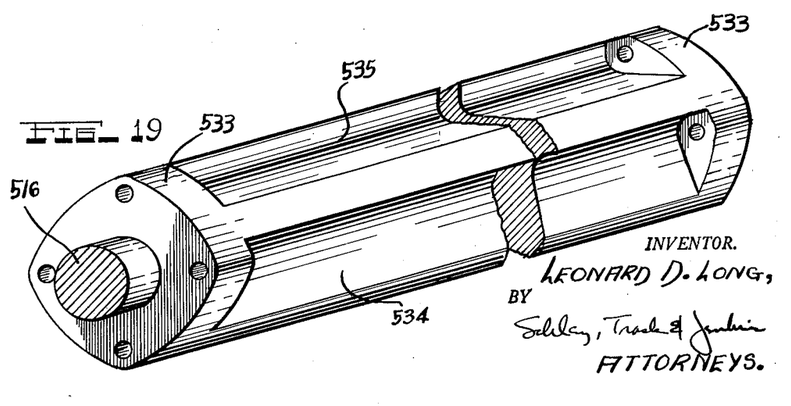
FIG. 19 is an enlarged isometric view of the cam shown in FIG. 15.
Figures 22, 23, 24:
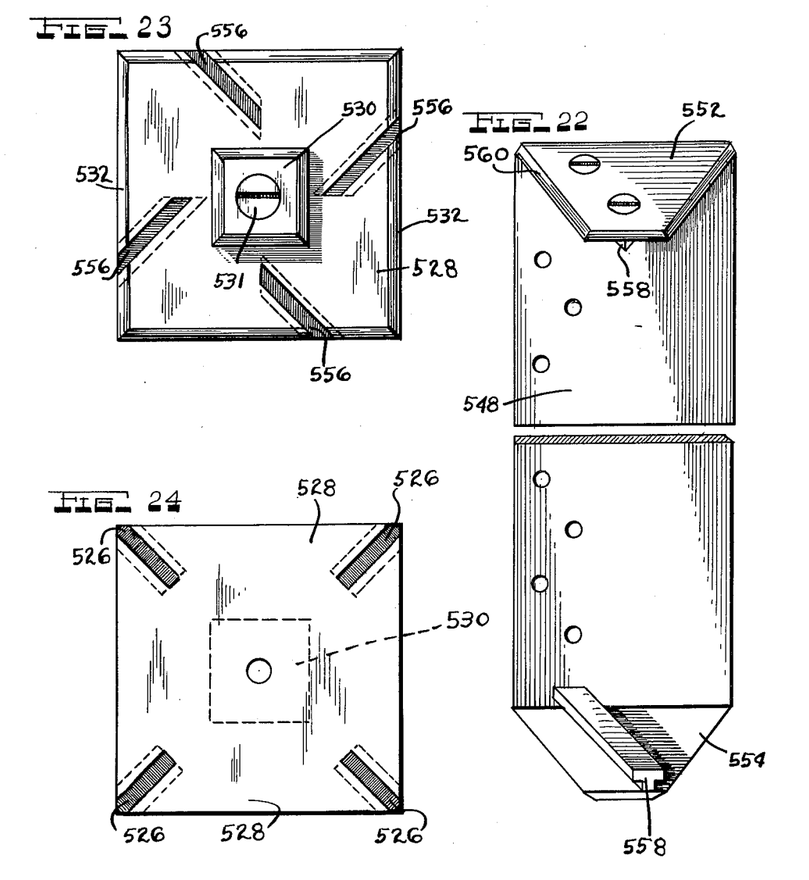
FIG. 22 is an enlarged isometric view of one of the face plates shown in FIG. 15.
FIG. 23 is a bottom plan view of the pilot plate shown in FIG. 14.
FIG. 24 is a top plan view of the pilot plate shown in FIG. 23.

The rotatable shaft 516 extends downwardly through the opening in the shaft 510 to thus interpose its lower end between the four core segments 518. As shown in FIG. 19, the ends of this lower portion of the shaft 516 are defined by a pair of heads 533 which have a larger diameter than the remainder of the shaft and abut the opposed faces of the plates 512 and 528 to thus hold the shaft and core segments in fixed vertical position with respect to each other. Four angularly disposed recesses 534 are provided between the heads 533, and as shown in FIG. 19, each of said recesses has a teardrop configuration including a cam face 535 adapted to bear against a vertically extending cam follower 536. Each of the cam followers 536 is swingably mounted in one of the recesses 534 by a pair of pins 537 interconnecting the ends of the cam follower to the heads 533. Each of the cam followers is also provided with a pair of studs 540 swingably joined to the core segments 518 by means of clips 542 mounted on said core segments adjacent their upper and lower ends. As shown, each of the clips extends inwardly from one of the thrust-receiving core segment faces 519 with its apertured inner end rotatably received over one of the studs 540. In this manner, the four core segments 518 are operatively connected to the shaft 516 and to each other with their thrust-receiving faces held in engagement with the cam followers 536.

Figure 16:
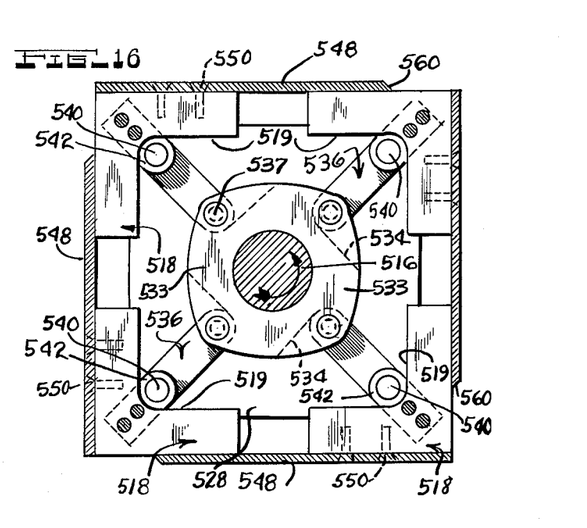
FIG. 16 is a horizontal section similar to FIG. 15, but showing the core-former in expanded position.
Figure 17:
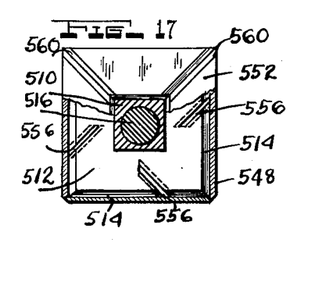
FIG. 17 is a horizontal section taken on the line 17—17 of FIG. 14, but with portions thereof broken away.

In order to prevent aggregate from entering the core-former when it is in expanded position, I mount a vertically extending face plate 548 on each of the core segments 518 as by countersunk screws 550. As shown in FIG. 16, each of the face plates 550 has a width corresponding to the width of the core-former in collapsed position so that it bridges the space between a pair of adjacent core segments when the core-former is in expanded position. Extending inwardly from the upper and lower ends of the face plates are top and bottom cover plates 552 and 554, respectively, extending inwardly over the outer faces of the spider plate 512 and pilot plate 528 to abut the shaft 510 and pilot 530. In order to guide the movements of the cover plates during expansion and contraction of the core-former, the outer faces of the spider and pilot plates are provided with pluralities of keyways 556 which slidably receive keys 558 formed on the inner faces of each of the cover plates 552 and 554. As shown, the keys 558 and keyways 556 are disposed at a 45° angle to the transverse core-former axes, the angle of movement of the face plates 548 and core segments 518. Conveniently, the edges of the face plates 548 and cover plates 552 and 554 are beveled, as at 560, to screed any aggregate from the surfaces on which they slide during contraction of the core-former.

Thus, the operation of the core-former shown in FIGS. 14–24 may be described as follows: The shaft 510 is moved axially to position the core-former in a mold, with the pilot 530 seating said core-former in an operative position therein. When the shaft 516 is rotated through a 45° angle in a clockwise direction as viewed in FIG. 15, the cam faces 535 will bear against the cam followers 536 to move them from their collapsed positions in which they are parallel to the transverse axes of the core-former to their extended positions in which they lie on the oblique axes of the core-former, said cam followers pivoting about the axes of the pins 537. As the cam followers are moved toward their expanded positions, they bear against the thrust-receiving faces 519 on the core segments to move said core segments outwardly into spaced relation to each other. This outward movement of the core segments on the oblique axes of the core-former is guided by the keys 520 and 524 sliding in the keyways 522 and 526 in the spider plate 512 and the pilot plate 528. With the core segments in this expanded position shown in FIG. 16, the face plates 548 bridge the spaces between the spaced pairs of adjacent core segments along the side faces of the core-former to prevent the entry of aggregate therein. And the top and bottom cover plates 552 and 554 cooperating with the spider plate 512 and pilot plate 528 prevent the entry of aggregate into the core-former from the top and bottom thereof.

To retract the core-former into its collapsed position, the shaft 516 is rotated through a 45° angle in a counter-clockwise direction as viewed in FIG. 16. This rotational movement of the shaft pulls the cam followers 536 inwardly with the studs 540 on said cam followers pulling the core segments 518 inwardly by means of the clips 542. Such inward movement of the core segments is also guided by their keys 520 and 524 moving in their respective keyways in the plates 512 and 528. During this inward movement of the core segments, the beveled edges on the face plates and the spider and pilot plates will slide along the outer faces of the core segments to screed any aggregate therefrom, with the beveled edges of the top and bottom cover plates 552 and 554 screeding the outer faces of said spider and pilot plates.

Another modified form of my expandable core-former is illustrated in FIGS. 25–35. This modification of my core-former requires the thrust-transmitting shaft 580 to rotate through an angle of 90° as contrasted to the 45° movement of the shafts 300 and 516 in the previously described core-former modifications.

Figures 25, 26, 27, 28, 29:
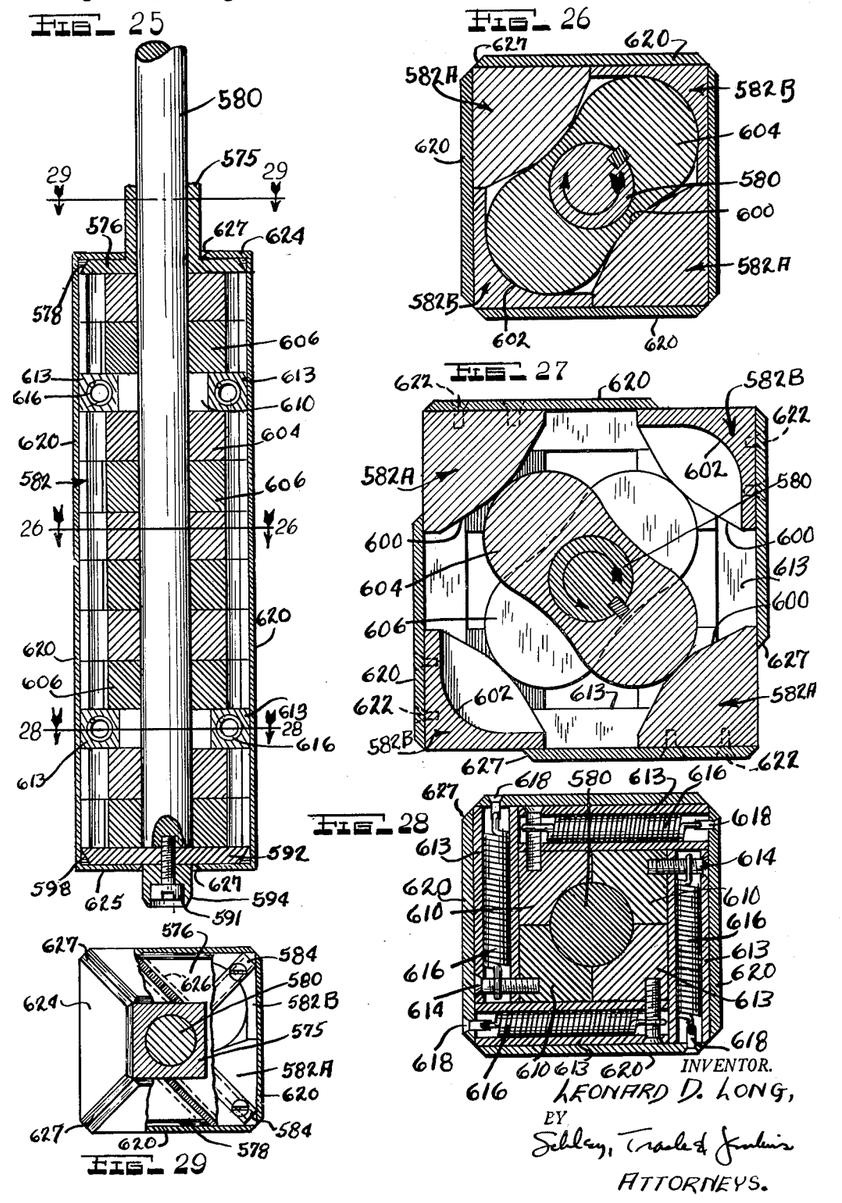
FIG. 25 is a vertical section through another modified form of my expandable core-former.
FIG. 26 is a horizontal section taken on the line 26—26 of FIG. 25.
FIG. 27 is a horizontal section similar to FIG. 26, but showing the core-former in expanded position.
FIG. 28 is a horizontal section taken on the line 28—28 of FIG. 25.
FIG. 29 is a horizontal section taken on the line 29—29 of FIG. 25 with portions thereof broken away.

As shown in FIG. 25, the core-former is carried on a vertically extending shaft 575 for moving the core-former into and out of a mold. A spider plate 576 is rigidly mounted on one end of the shaft 575 for connecting the core-former to said shaft, and as shown in FIG. 29, said plate 576 has a lateral extent substantially as large as the lateral extent of the core-former in its collapsed position, and has its edges beveled, as at 578. The core-former is expanded by means of the rotatable shaft 580 extending upwardly through the shaft 575 for connection to a rotational power source.

Figure 33:
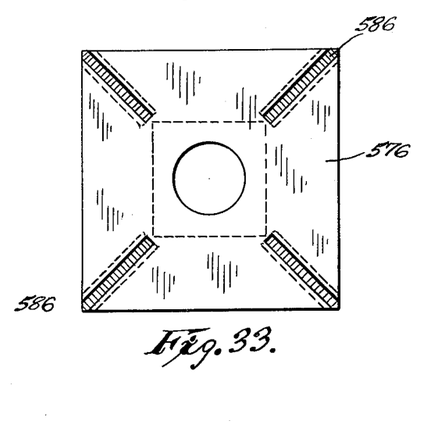
FIG. 33 is a bottom plan view of the spider plate shown in FIG. 29.
Figure 34:
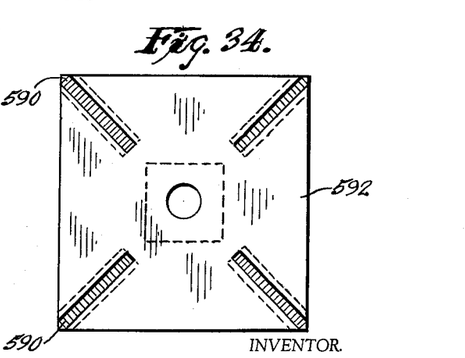
FIG. 34 is a top plan view of the pilot plate shown in FIG. 35.

As shown in FIG. 26, the core-former is provided with elongated core segments 582 disposed at the four corners of the core-former and slidably connected to the plate 576. To this end, a T-shaped key 584 is mounted on the upper end of each of the core segments 582 and is slidably received in a T-shaped keyway 586 formed in the lower face of the plate 576. As shown in FIG. 33, the keyways 586 are disposed on the oblique axes of the plate 576 and extend inwardly from each of its corners.

Similarly, a T-shaped key 588 is mounted on the lower face of each of the core segments 582 and is slidably received in a T-shaped keyway 590 disposed on an oblique axis of the upper face of a pilot plate 592. A rectangularly shaped pilot 594 extends downwardly from the pilot plate 592 for reception in an opening in the bottom of a mold upon movement of the core-former into said mold, said pilot engaging the faces of said opening to prevent the core-former from rotating in the mold. As shown in FIG. 25, a bolt 591 extends upwardly through the pilot to rotatably connect the pilot plate 592 to the lower end of the shaft 580. Conveniently, the pilot plate 592 has its edges beveled, as at 598, and has a lateral extent corresponding to the lateral extent of the spider plate 576.

As shown in FIG. 27, the inwardly presented faces of each of the core segments comprises a plurality of vertically spaced thrust-receiving faces 600 which project inwardly toward the vertical core-former axis. Between each of the thrust-receiving faces 600, the core segment is recessed as at 602. The core segments 582 are arranged in diagonally opposed pairs 582A and 582B with the thrust-receiving faces 600 of the pair 582A being disposed in horizontal alignment with the recesses 602 in the pair 582B, and vice versa.

The shaft 580 extends downwardly through the shaft 575 and carries two sets of double-lobed cams 604 and 606 mounted on its lower portion and engageable with the core segments 582. As shown in FIG. 26, the set of cams 604 lies on one oblique axis of the core-former when it is in collapsed position for reception in the recesses 602 in the pair of the diagonally opposed core segments 582B. The other set of cams 606 is disposed 90° out of alignment with the set of cams 604, and is alternately mounted on the shaft 580 between the cams 604 so that each of the cams 606 lies in the recesses 602 of the other pair of diagonally opposed core segments 582A. In this manner, the cams 604 and 606 are both disposed in the recesses 602 of the several core segments when the core-former is in collapsed position with the adjacent faces of adjacent core segments being disposed in abutting relationship. As shown in FIG. 26, the thrust-receiving faces 600 on the core segments are curved inwardly toward the vertical core-former axis along the same radius of curvature as the central portion of the cams 604 and 606 interconnecting the cam lobes to thus minimize the lateral extent of the core-former in its collapsed position.

Figures 30, 31, 32:
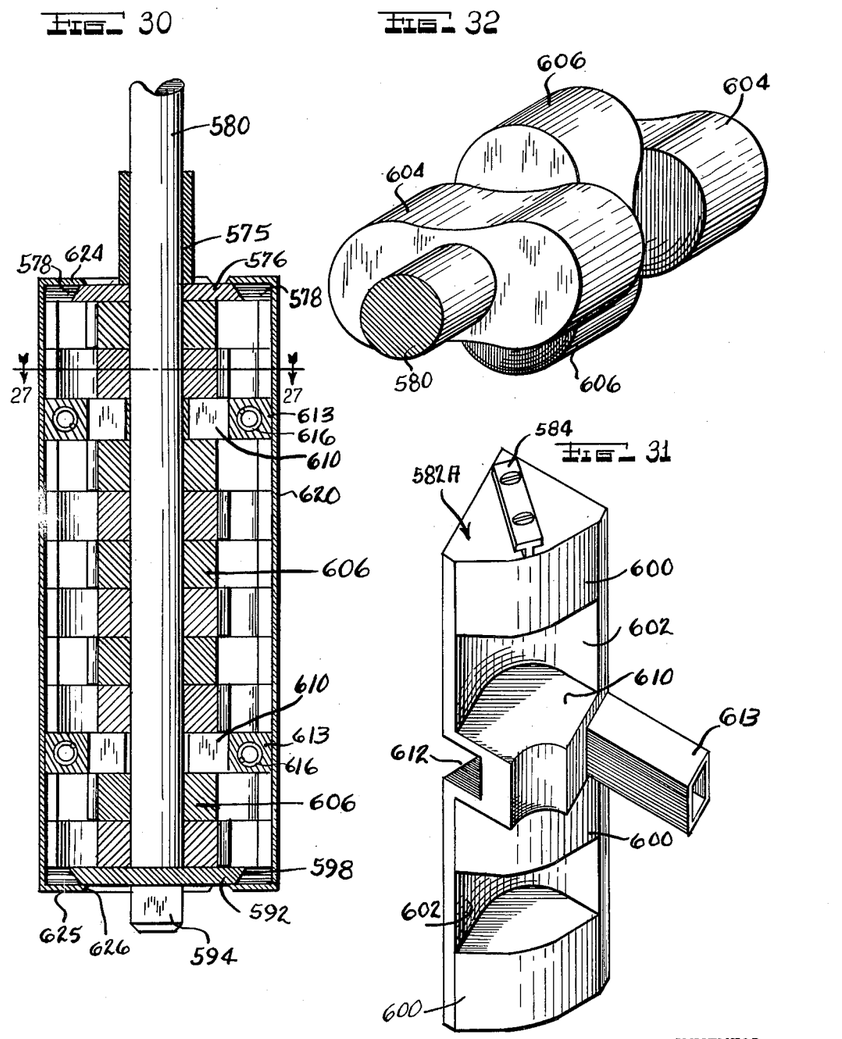
FIG. 30 is a vertical section of the core-former shown in FIG. 25, but showing said core-former in expanded position.
FIG. 31 is an enlarged fragmentary isometric view of one of the core segments shown in FIG. 25.
FIG. 32 is an enlarged fragmentary isometric view of the cams shown in FIG. 25.

As shown in FIGS. 25 and 31, the series of alternate thrust-receiving faces 600 and recesses 602 on each of the core segments is interrupted adjacent the upper and lower ends of the core segment by a pair of inwardly projecting sleeve blocks 610. Each of said sleeve blocks is provided with openings 612 for the reception of a pair of horizontally disposed sleeves 613 slidably interconnecting the adjacent core segments 582A and 582B. As shown in FIG. 28, one end of each of said sleeves is connected to one of the core segments in each pair of adjacent core segments by a countersunk bolt 614 around which one end of a coil spring 616 is received. The opposite end of said spring is connected to a countersunk bolt 618, countersunk in a face plate 620 rigidly mounted on the core segment adjacent the core segment in which the bolt 614 is received. In this manner, each of the springs 616 biases a pair of adjacent core segments toward each other to urge the core-former into its collapsed position.

Figure 35:
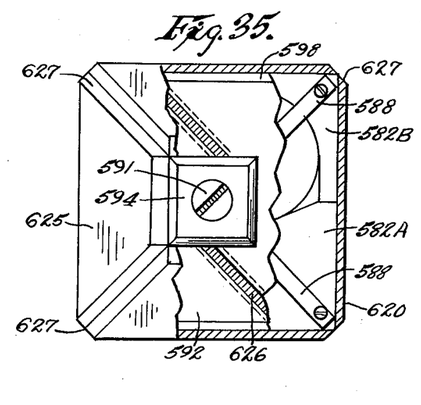
FIG. 35 is a bottom plan view of the core-former shown in FIG. 25, but with portions thereof broken away.

Each of the face plates 620 is mounted on one of the core segments 582 as by countersunk screws 622, and serves to prevent the entry of aggregate into the core-former when it is in expanded position. As shown in FIG. 27, each of the face plates 620 has a width corresponding to the width of the core-former in collapsed position so that it bridges the space between a pair of adjacent core segments 582A and 582B when the core-former is in expanded position. Extending inwardly from the upper and lower ends of the face plates are top and bottom cover plates 624 and 625, respectively, extending inwardly over the outer faces of the spider plate 576 and pilot plate 592 to abut the shaft 575 and pilot 594. In order to guide the movements of the cover plates during expansion and contraction of the core-former, the outer faces of the spider and pilot plates are provided with pluralities of keyways 626 which slidably receive keys 630 mounted on the inner faces of each of the cover plates 624 and 625. As shown in FIGS. 29 and 35, the keys 626 and keyways 630 are disposed at a 45° angle to the transverse core-former axes, the angle of movement of the face plates 620 and core segments 582. Conveniently, the edges of the face plates 620 and cover plates 624 and 625 are beveled, as at 627, to screed any aggregate from the surfaces on which they slide during contraction of the core-former.

Thus, the operation of the core-former illustrated in FIGS. 25–35 may be described as follows: The shaft 575 is moved axially to position the core-former in a mold, with the pilot 594 seating said core-former in an operative position therein. When the shaft 580 is rotated through a 90° angle in a clockwise direction as viewed in FIG. 26, the cams 604 will rotate into engagement with the thrust-receiving faces 600 on the opposed pair of core segments 582A, and the cams 606 will be rotated into engagement with the thrust-receiving faces 600 on the diagonally opposed pair of core segments 582B. As shown in FIG. 27, movement of the cams 604 and 606 against the thrust-receiving faces on the several core segments causes said core segments to move outwardly in spaced relation to each other on the oblique axes of the core-former to expand said core-former. This outward movement of the core segments is guided by the keys 584 and 588 on the core segments sliding in the keyways in the spider and pilot plates 576 and 592, and by the sleeves 613 sliding in the core segment openings 612. With the core segments in this expanded position, as shown in FIG. 27, the face plates 620 bridge the spaces between the spaced pairs of adjacent core segments along the side faces of the core-former to prevent the entry of aggregate therein. And the top and bottom cover plates 624 and 625 cooperating with the spider plate 576 and pilot plate 592 prevent the entry of aggregate into the core-former from the top and bottom thereof.

To retract the core-former into its collapsed position, the shaft 580 is rotated through an angle of 90° in a counterclockwise direction as viewed in FIG. 27. This rotational movement of the shaft moves the cams 604 and 606 into the recesses 602 in the core segments 582B and 582A respectively. With the cams out of engagement with the thrust-receiving faces on the core segments, said core segments are pulled inwardly toward their collapsed positions by the plurality of springs 616. Such inward movement of the core segments is also guided by their respective keys sliding in the spider and pilot plates and by the sleeves 613 in which the springs 616 are carried.

During this inward movement of the core segments, the beveled edges on the face plates and the spider and pilot plates will slide along the outer faces of the core segments to screed any aggregate therefrom, with the beveled edges of the top and bottom cover plates 624 and 625 screeding the outer faces of said spider and pilot plates.

Figures 36, 37, 38, 39, 40:
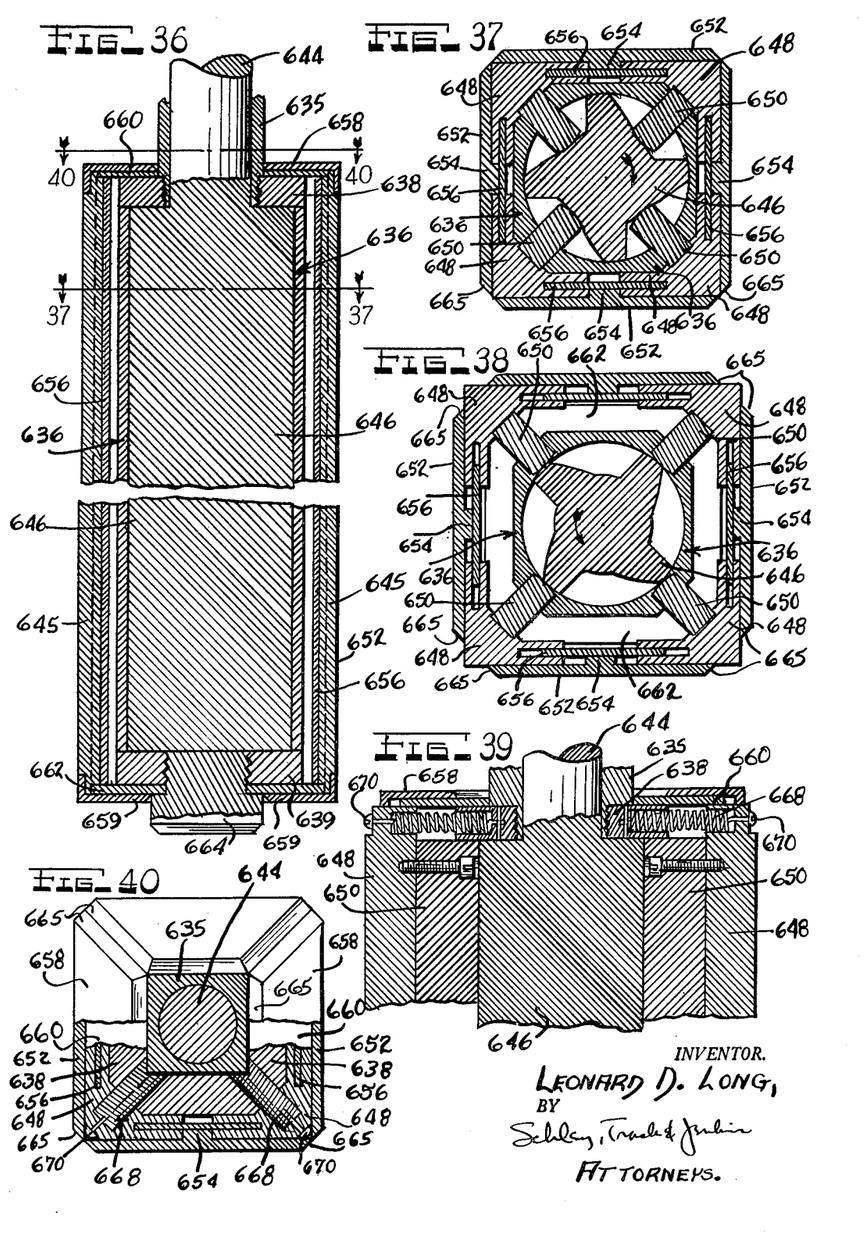
FIG. 36 is a vertical section through another modified form of my expandable core-former.
FIG. 37 is a horizontal section taken on the line 37—37 of FIG. 36.
FIG. 38 is a horizontal section taken on the line 37—37 of FIG. 36, but showing the core-former in expanded position.
FIG. 39 is a fragmentary enlarged vertical section of the core-former shown in FIG. 36, but taken on an oblique core-former axis and showing the core-former in expanded position.
FIG. 40 is a horizontal section taken on the line 40—40 of FIG. 36, but showing portions of the core-former broken away.
Figure 41:
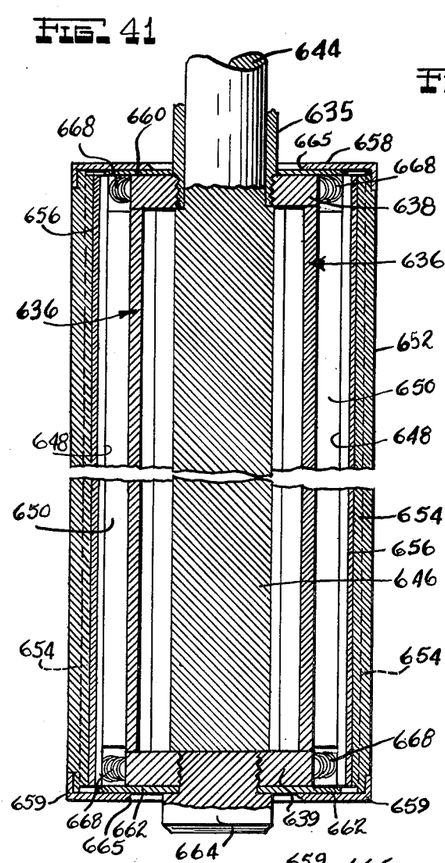
FIG. 41 is a vertical section similar to FIG. 36, but showing the core-former in expanded position.
Figure 42:
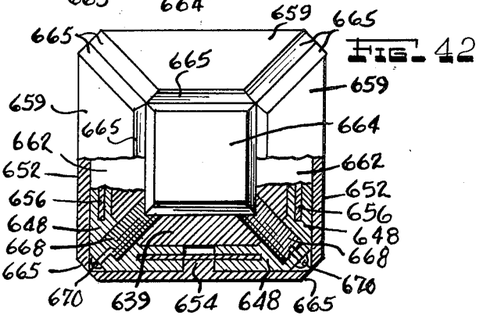
FIG. 42 is a bottom plan view of the core-former shown in FIG. 36, but with portions thereof broken away.
Figure 43:
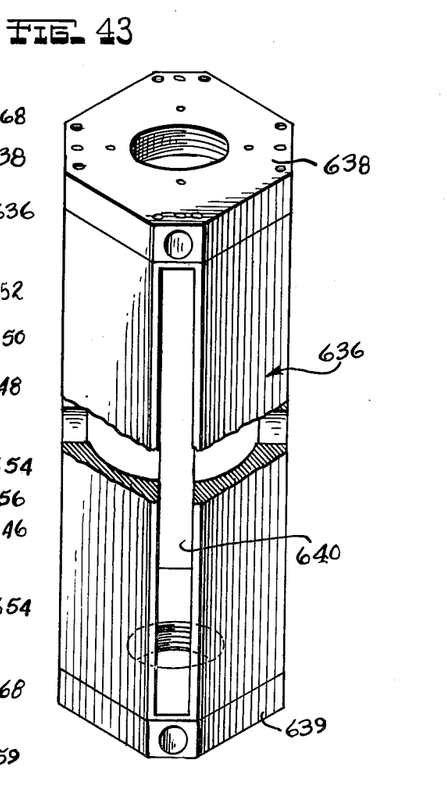
FIG. 43 is an enlarged isometric view of the cam sleeve shown in FIG. 37.

Another modification of my expandable core-former is illustrated in FIGS. 36–43. In such modification, the core-former is movable into and out of operative position on a mold by means of an outwardly extending shaft 635. As shown in FIG. 36, an elongated sleeve 636 having a pair of inwardly extending end blocks 638 and 639 is rigidly mounted on the lower end of the shaft 635, as by threadably connecting the end block 638 thereto. The sleeve 636 has an octagonal cross-section, and on its alternate faces is provided with a plurality of elongated slots 640 extending between the end blocks 638 and 639.

The core-former is expanded by means of a rotatable shaft 644 extending upwardly through the shaft 635 for connection to a rotational power source. The lower end of the shaft 644 comprises a quadri-lobed cam 646 rotatably carried in the sleeve 636 with the end faces of said cam slidably rotating against the opposed inner faces of the end blocks 638 and 639 and the outer faces of the cam lobes being slidable against the inner walls of said sleeve. As shown, the cam lobes are disposed on the transverse and oblique core-former axes when the core-former is in its collapsed and expanded positions, respectively.

As shown in FIG. 37, four elongated core segments 648 having lengths generally corresponding to the length of the sleeve 636 including its end blocks are disposed at each corner of the core-former. The inwardly presented faces of each of the core segments comprise three angularly disposed faces adapted to abut the adjacent outer faces of the sleeve 636 with an elongated cam follower 650 keyed and bolted to the intermediate inwardly presented face and projecting inwardly therefrom through one of the sleeve slots 640. As shown in FIG. 37, each of the cam followers 650 is disposed on an oblique core-former axis, and is thus received between a pair of the lobes on the cam 646 when the core-former is in its collapsed position.

In order to prevent aggregate from entering the core-former when it is in expanded position, I mount a vertically extending face plate 652 on each pair of adjacent core segments 648. Each of the face plates 652 has a width corresponding to the width of the core-former in collapsed position so that it bridges the space between a pair of adjacent core segments when the core-former is in expanded position. A rib 654 projects inwardly from each face plate between a pair of adjacent core segments for connection to a slide 656 slidably carried in a pair of aligned slots formed in the adjacent faces of a pair of adjacent core segments for thus holding the face plate on said core segments.

Extending inwardly from the upper and lower ends of the face plates are top and bottom cover plates 658 and 659, respectively. As is best shown in FIG. 39, a screed plate 660 is received on the shaft 635 and is interposed between the outwardly presented face of the end block 638 and the top cover plates 658. The screed plate has a lateral extent only slightly smaller than the lateral extent of the core-former in its collapsed position, and thus acts in combination with the cover plates 658 to close the upper end of the core-former when it is in its expanded position to prevent aggregate from entering the upper end of said core-former.

Similarly, a pilot plate 662 is interposed between the outer face of the end block 639 and the bottom cover plates 659 to act in combination with said cover plates to prevent aggregate from entering the bottom of the core-former when it is in its expanded position. Extending upwardly through the pilot plate 662 is a pilot 664 threadably received in the end block 639 and having a generally rectangularly shaped lower end adapted to seat in an opening in the bottom of the mold and engage the faces thereof to prevent the core-former from rotating in said mold. As shown in FIG. 36, the cover plates 658 and 659 extend inwardly from their respective face plate 652 to abut the shaft 635 and pilot 664 when the core-former is in its collapsed position. Said cover plates, during collapse of the core-former, slide against the screed and pilot plates, and the face plates 652 slide against the outwardly presented faces of the core segments 648, to screed any aggregate therefrom. Conveniently, to facilitate such screeding, the edges of the said face and cover plates are beveled, as at 665.

The cam 646 is adapted to effect only an expansion of the core-former, and thus to collapse said core-former and to hold the core segments 648 in operative position, I mount a pair of coil springs 668 on each of the core segments 648 adjacent each of their ends. The springs 668 at the upper end of the core segments are received in recesses formed therein and extend inwardly therefrom on the oblique core-former axes for reception in recesses formed in the end block 638, the ends of said springs being retained in position by screws 670. Similarly, the springs 668 at the lower ends of the core segments are recessedly mounted in said core segments and the lower end block 639.

Thus, the operation of the core-former illustrated in FIGS. 36–43 is as follows: The shaft 635 is moved axially to position the core-former in a mold, with pilot 664 seating said core-former in an operative position therein. When the shaft 644 is rotated through a 45° angle, in a clockwise direction as viewed in FIG. 37, the lobes on the cam 646 bear against the cam followers 650 to force them outwardly in the sleeve slots 640 to thus move the core segments outwardly on the oblique core-former axes. During such expansion, the sleeve 636 remains in a fixed angular position so that the sliding movements of the cam followers 650 in the slots 640 will guide the expansion movements of the core segments and prevent any rotation thereof, the slides 656 providing additional guiding action. With the core segments in this expanded position shown in FIG. 38, the face plates 652 bridge the spaces between the spaced pairs of adjacent core segments along the side faces of the core-formers to prevent the entry of aggregate therein, and the top and bottom cover plates 658 and 659 cooperate with the screed plate 660 and pilot plate 662 prevent the entry of aggregate into the core-former from the top and bottom thereof.

To retract the core-former into its collapsed position, the shaft 644 is rotated through a 45° angle in a counter-clockwise direction as viewed in FIG. 38. Such rotational movement disengages the lobes on the cam 646 from the cam followers 650, and the core segments 648 are thus pulled inwardly by the springs 668 until the cam followers 650 abut the faces of the cam 646 between its cam lobes, as shown in FIG. 37. The inward movement of the core segments is guided by the cam followers 650 sliding in the sleeve slots 640 and by the face plate slides 656 sliding in the aligned slots formed in the pairs of adjacent core segments. During this inward movement of the core segments, the beveled edges 665 on the face plates and their cover plates 658 and 659 slide against the outer faces of the core segments and the screed and pilot plates to screed any aggregate therefrom. With the core-former in its collapsed position, it may be removed from the mold by applying a lifting force to the shaft 635. As can be seen from FIG. 36, this lifting force causes the upper end block 638 to bear against the screed plate 660, and the ends of the sleeve slots 640 to bear against the lower ends of the cam followers 650, to thus raise the entire core-former out of the mold.

Figure 44:
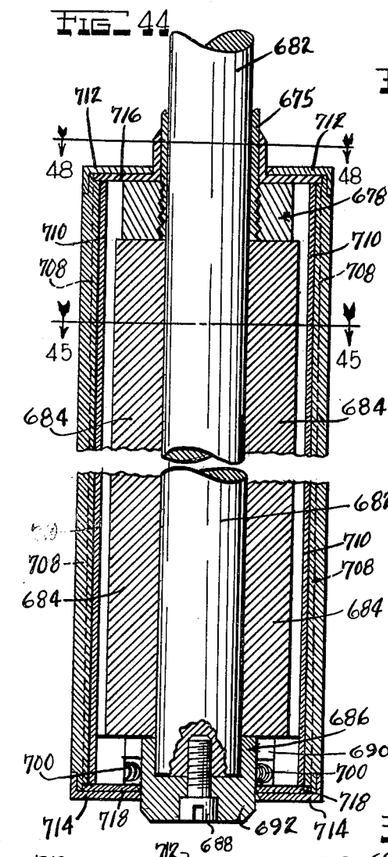
FIG. 44 is a vertical section through another modified form of my expandable core-former.

Still another modification of my expandable core-former is illustrated in FIGS. 44–53. In such modification, the core-former is movable into and out of operative position in a mold by means of a shaft 675 projecting outwardly from its connection to the core-former. As shown in FIG. 44, the lower end of the shaft 675 is threadably connected to a spider block 678 having a plurality of outwardly projecting arms 680 disposed on the oblique core-former axis. The core-former is expanded by means of a rotatable shaft 682 extending upwardly through the shaft 675 for connection to a rotational power source. A quadri-loaded cam 684 whose cam lobes are disposed on the transverse core-former axes when said core-former is in its collapsed position is mounted on the lower end of the shaft 682. As shown in FIG. 44, the upper face of the cam 684 is rotatably slidable against the lower face of the spider block 678, and the lower face of said cam is rotatably slidable on the upper face of a second spider block 686 rotatably connected to the lower end of the shaft 682, as by a bolt 688. The spider block 686 also has a plurality of outwardly projecting arms 690 parallel to the spider arms 680, and is further provided with a pilot 692 projecting outwardly from the lower end of the core-former for reception in an opening in the bottom of a mold to engage the faces thereof and prevent the core-former from rotating in the mold.

Figure 45:
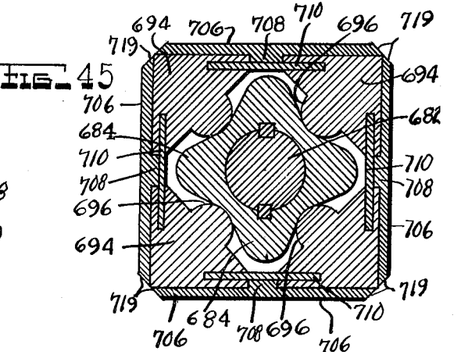
FIG. 45 is a horizontal section taken on the line 45—45 of FIG. 44.

As shown in FIG. 45, the core-former is provided with four elongated core segments 694, each of which has a pair of outer faces normal to each other and an inner face provided with an inwardly projecting cam follower 696 which is receivable between a pair of lobes on the cam 684 when the core-former is in its collapsed position. Adjacent each of its ends, each of the cam followers 696 is provided with openings 698 adapted to slidably receive the spider arms 680 and 690 whereby said arms will guide the movements of the core segments during expansion and collapse of the core-former. A second set of openings 699 is also formed in each of the cam followers 696 adjacent each of its ends for the reception of coil springs 700 secured to the core segments as by pins 702. The inwardly presented ends of the springs 700 are received in openings 703 and 703' formed in spider blocks 678 and 686, respectively, and are retained therein by pins 704. As will be clear from FIGS. 46 and 47, the springs 700 and the spider arms 680 and 690 are all disposed on the oblique axes of the core-former.

In order to prevent aggregate from entering the core-former when it is in expanded position, I mount a plurality of face plates 706 on the several core segments 694. As shown in FIG. 45, each of the face plates 706 has a width corresponding to the width of the core-former in collapsed position so that it bridges the space between a pair of adjacent core segments when the core-former is in expanded position. Each of the face plates 706 has a rib 708 extending inwardly therefrom between a pair of adjacent core segments 694 for connection to a slide 710 slidably carried in aligned slots formed in the adjacent faces of a pair of adjacent core segments. Extending inwardly from the upper and lower ends of the face plates 706 are top and bottom cover plates 712 and 714, respectively. The top cover plates 712 extend inwardly over a screed plate 716 interposed between said cover plates and the upwardly presented faces of the spider block 578 and the core segments 694. Similarly, the bottom cover plates 714 extend inwardly over a pilot plate 718 interposed between said cover plates and the downwardly presented faces of the spider block 686 and the core segments 694. Conveniently, the screed and pilot plates 716 and 718 have lateral extents only slightly smaller than the lateral extent of the core-former in its collapsed position so that they will act in combination with the cover plates 712 and 714 to prevent aggregate from entering the ends of the core-former when it is in expanded position. As shown, the edges of the face plates 706 and their cover plates 712 and 714 are beveled, as at 719, so that upon collapse of the core-former said face and cover plates will screed any aggregate from the outwardly presented faces of the core segments and the screed and pilot plates.

Thus, the operation of the core-former shown in FIGS. 44-53 may be described as follows: The shaft 675 is moved axially to position the core-former in a mold with the pilot 692 seated in an opening formed therein, and the shaft 682 is rotated through a 45° angle in a clockwise direction as viewed in FIG. 45 to cause the lobes on the cam 684 to bear against the cam followers 696 to thus move the core segments outwardly in spaced relation to each other on the oblique core-former axes. As the core segments are moved to their expanded positions, they are guided by the spider arms 680 and 690 sliding in their respective openings formed in the cam followers 696, and by the face plate slides 710. With the core segments in this expanded position shown in FIG. 46, the face plates 706 bridge the spaces between the spaced pairs of adjacent core segments along the side faces of the core-former to prevent the entry of aggregate therein. And the top and bottom cover plates 712 and 714 cooperating with the spider plate 716 and pilot plate 718 prevent the entry of aggregate from the core-former from the top and bottom thereof.

Figure 46:
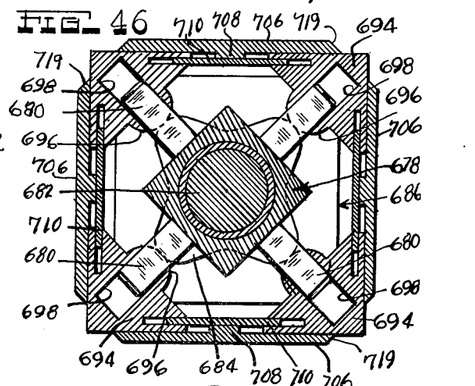
FIG. 46 is a horizontal section taken on the line 46—46 of FIG. 49.
Figure 47:
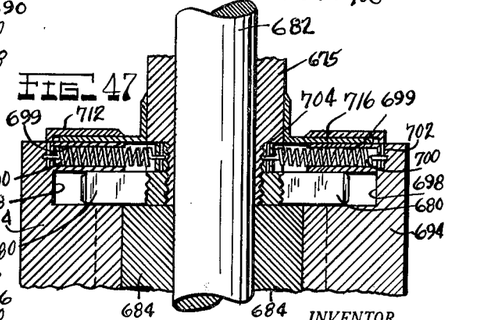
FIG. 47 is a fragmentary enlarged vertical section of the core-former shown in FIG. 44, but taken on an oblique core-former axis and showing the core-former in expanded position.
Figure 48:
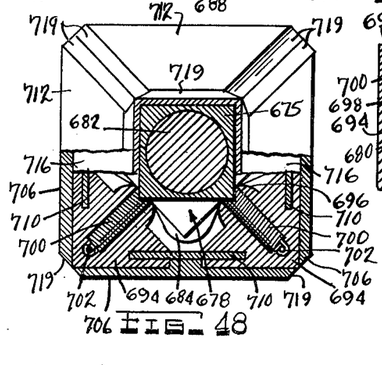
FIG. 48 is a horizontal section taken on the line 48—48 of FIG. 44, but showing portions of the core-former broken away.
Figure 49:
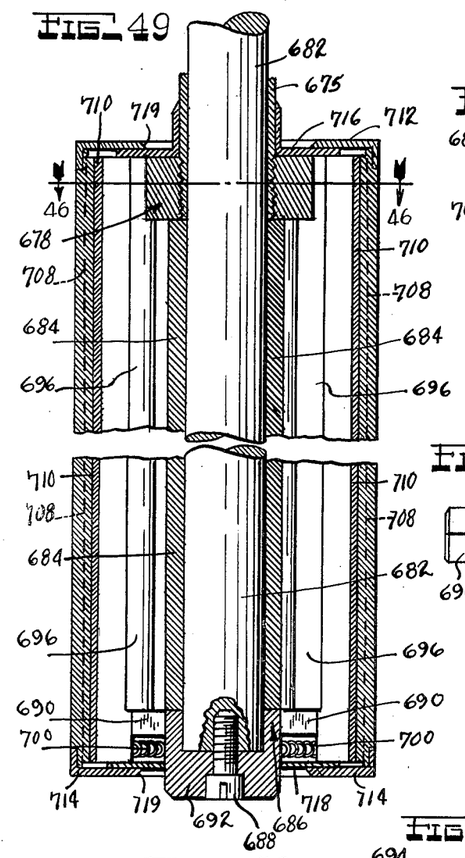
FIG. 49 is a vertical section similar to FIG. 44, but showing the core-former in expanded position.
Figure 50:
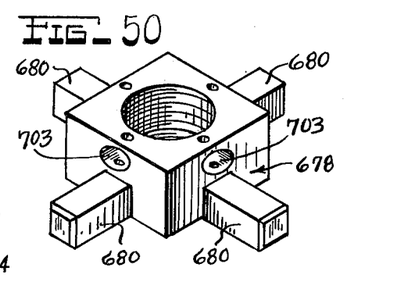
FIG. 50 is an enlarged isometric view of the spider block shown in FIG. 44.
Figure 51:
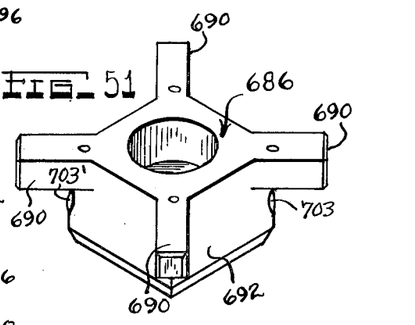
FIG. 51 is an enlarged isometric view of the pilot block shown in FIG. 44.
Figure 52:
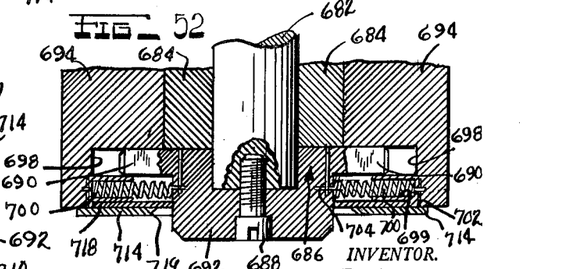
FIG. 52 is a fragmentary enlarged vertical section similar to FIG. 47, but showing the opposite end of the core-former.
Figure 53:
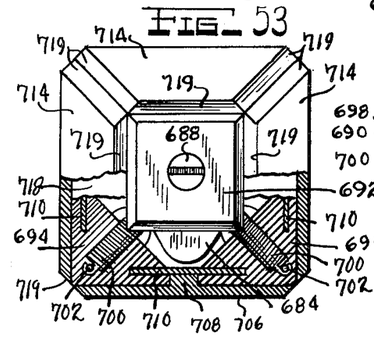
FIG. 53 is a bottom plan view of the core-former shown in FIG. 44, but with portions thereof broken away.

To retract the core-former to its collapsed position, the shaft 682 is rotated in a counterclockwise direction as viewed in FIG. 46. Such rotation moves the lobes on the cam 684 out of bearing engagement with the cam followers 696, and the core segments 694 are thus pulled inwardly on the oblique core-former axes by the springs 700. The inward collapsing movement of the core segments 694 is also guided by the spider arms 680 and 690 and by the slides 710 on the face plates 706. During this inward movement of the core segments, the beveled edges of the face plates 706 and the top and bottom cover plates 712 and 714 will slide along, and screed any aggregate from, the outer faces of the core segments 694 and the screed and pilot plates 716 and 718.

I claim:

1. An expandable core-former, comprising a plurality of core segments movable in respect to each other and each having a concave inwardly presented face provided with a plurality of spaced recesses lying in the plane of an oblique core-former axis, a roller carried in each of said recesses, a first shaft having means slidably connected to said core segments for guiding the movements of said core segments with respect to each other, said first shaft being axially movable for moving the core-former to and from an operative position in the mold, a second shaft carried in said first shaft in a fixed axial position and rotatable with respect to said core segments and rotatable with respect to said first shaft, said second shaft projecting beyond said first shaft and interposed between the core segments and having cam means mounted in a fixed axial position thereon and rotatable therewith, said cam means comprising cam lobes disposed in thrust-transmitting engagement with said rollers upon rotation of said second shaft in one direction to force said core segments uniformly outwardly in spaced relation to each other to expand the core-former and interposed between said rollers in the planes of the transverse core-former axes upon rotation of said second shaft in an opposite direction, means operatively interconnecting said core segments and moving them toward each other to collapse the core-former upon rotation of said second shaft in said opposite direction, a plurality of face plates on said core segments bridging the spaces therebetween when the core segments are in spaced relation to each other, and a pilot plate slidably engageable with one end of the core segments with a pilot projecting outwardly therefrom for releasably retaining the core-former in a fixed nonrotatable position in a mold, said face plates having cover plates at each of their ends extending inwardly over the means on said first shaft and pilot plate to close the ends of the core-former.

2. An expandable core-former as set forth in claim 1 in which said rollers are axially spaced on said core segments and project inwardly therefrom, said face plates have ribs projecting inwardly between adjacent pairs of core segments on the transverse core-former axes, a plurality of guide rods each of which is slidably received in a pair of adjacent core segments and the rib interposed therebetween, and said cam means comprises first and second sets of said cam lobes, said first set of cam lobes being engageable with said rollers and second set of cam lobes being engageable with said ribs during rotation of said second shaft in said one direction to force the core segments outwardly into spaced relation to each other and to brace said face plates bridging the spaces between the spaced core segments.

3. An expandable core-former as set forth in claim 2 in which said ribs are recessed in the planes of said rollers, said first set of cam lobes are received in the recesses formed in said ribs when the core-former is in collapsed position and movable into engagement with said rollers for expanding the core-former, and said second set of cam lobes are disposed out of alignment with the first set of cam lobes for reception between said rollers when the core-former is collapsed and movable into engagement with said ribs for bracing the face plates when the core-former is expanded.

References Cited by the Examiner

UNITED STATES PATENTS

| | | | |
|---|---|---|---|
| 295,421 | 3/84 | Peavey. | |
| 404,673 | 6/89 | Bennett. | |
| 1,030,364 | 6/12 | Whitman. | |
| 1,312,157 | 8/19 | Buente. | |
| 2,030,724 | 2/36 | Smith | 25—128.1 |
| 2,170,188 | 8/39 | Cobi | 25—128 |
| 2,298,006 | 10/42 | George | 25—41.5 |
| 2,315,634 | 4/43 | McCall | 25—128 |
| 2,805,462 | 9/57 | Chandler et al. | 25—130 |
| 2,834,049 | 5/58 | White | 25—128 XR |
| 2,878,545 | 3/59 | Lowe | 25—128 |

FOREIGN PATENTS

| | | |
|---|---|---|
| 527,453 | 7/21 | France. |
| 412,467 | 5/25 | Germany. |
| 1,314 | 1898 | Great Britain. |

WILLIAM J. STEPHENSON, *Primary Examiner.*

MICHAEL V. BRINDISI, *Examiner.*